United States Patent Office 3,505,105
Patented Apr. 7, 1970

3,505,105
PROCESS FOR COATING ARTICLES WITH POLY-VINYL CHLORIDE COMPOSITIONS CONTAINING AS BONDING AGENT A MIXTURE OF A POLYISOCYANATE FREE FROM ISOCYANURATE RINGS AND AN ISOCYANURATE POLYMER
James Stewart Macfarlane, Thomas James Meyrick, and Vijay Ratna Sharma, Manchester, England, assignors to Imperial Chemical Industries Limited, London, England, a corporation of Great Britain
No Drawing. Filed Dec. 14, 1966, Ser. No. 601,530
Claims priority, application Great Britain, Dec. 20, 1965, 53,827/65
Int. Cl. B44d 1/44, 1/14; C08f 29/18
U.S. Cl. 117—138.8                                4 Claims

ABSTRACT OF THE DISCLOSURE

A process for coating materials with polyvinyl chloride which comprises applying to the said materials a polyvinyl chloride composition containing as bonding agent an organic polyisocyanate free from isocyanurate rings and an isocyanurate polymer of an organic polyisocyanate, and thereafter heating the coated material.

---

This invention relates to improved polyvinyl chloride compositions which are especially useful as coatings and adhesives.

It is well known that when substrates such as textile materials composed of synthetic fibers are coated with polyvinyl chloride coating compositions, the products are often unsatisfactory because of poor adhesion between the applied coating and the substrate. The successful coating of substrates such as textile materials composed of polyamides, polyesters and polyacrylonitrile with polyvinyl chloride compositions presents particular difficulties.

It has previously been proposed to improve the adhesion between polyvinyl chloride coating compositions and synthetic textile materials by incorporating in the coating composition as a bonding agent various organic polyisocyanates, that is to say certain organic compounds containing two or more isocyanate groups in the molecule. As examples of organic polyisocyanates which have been used for this purpose, there may be mentioned toluene disocyanate, diphenylmethane diisocyanate, triphenylmethane triisocyanate, and also isocyanurate polymers of toluene diisocyanate.

It has now been found that by incorporating in a polyvinyl chloride coating compositions a bonding agent which is a mixture of an orgnaic polyisocyanate free from isocyanurate rings with an isocyanurate polymer of an organic polyisocyanate, the adhesion between the said coating compositon and a substrate such as a synthetic textile material is improved to a substantially greater extent than that achieved by incorporating in the coating composition either the polyisocyanate or the isocyanurate polymer alone.

Thus according to the present invention there are provided improved polyvinyl chloride compositions characterised in that the compositions contain both an organic polyisocyanate free from isocyanurate rings and an isocyanurate polymer of an organic polyisocyanate.

The organic polyisocyanates which are used as constituents of the compositions of the invention may be aliphatic, cycloaliphatic or aromatic, and they may be diisocyanates or subtances containing more than two isocyanate groups in the molecule. Examples of suitable diisocyanates include butylene-1:4-diisocyanate, hexamethylene-1:6-diisocyanate, dicyclohexylmethane - 4:4′-diisocyanate, tolylene-2:4 - diisocyanate, tolylene-2:6-diisocyanate, diphenylmethane - 4:4′ - diisocyanate, 3-methyldiphenylmethane-4:4′ - diisocyanate, m- and p-phenylene diisocyanate, chlorophenylene - 2:4 - diisocyanate, naphthalene - 1:5 - disocyanate, diphenyl - 4:4′-diisocyanate, 4:4′ - diisocyanato - 3:3′ - dimethyldiphenyl, 4:4′-diisocyanato - 3:3′ - dimethoxydiphenyl and diphenyl ether 4:4′ - diisocyanate. Examples of triisocyanates which may be used are 2:4:6-triisocyanato-toluene, 2:4:4′-triisocyanatodiphenylether and triphenylmethane 4:4′:4″ - triisocyanate. Examples of other suitable organic polyisocyanates are the reaction products of an excess of an organic diisocyanate, such as any of those diisocyanates referred to above, with a polyhydric alcohol such as trimethylolpropane, also uretedione dimers of organic polyisocyanates, for example of tolylene diisocyanate or of diphenylmethane diisocyanate. Mixtures of polyisocyanates may be used, for example mixtures of tolylene-2:4-diisocyanate and tolylene-2:6-diisocyanate or any other polyisocyanate composition obtained by the phosgenation of the mixed reaction products of formaldehyde and aromatic amines such as aniline and o-toluidine.

In view of the fact that the compositions of the invention, when employed as coatings or adhesives, are cured by heating at elevated temperatures, it is preferred to use polyisocyanates which are of low volatility, for example diphenylmethane - 4:4′ - diisocyanate, 4:4′-diisocyanato-3:3′ - dimethoxydiphenyl, the polyisocyanate compositions obtained by the phosgenation of mixed polyamines referred to above, or the above-mentioned triisocyanates.

The isocyanurate polymers of organic polyisocyanates which are used as constituents of the compositions of the invention may be isocyanurate polymers of any of the polyisocyanates referred to above. Such isocyanurate polymers may be obtained from the polyisocyanates by any of the known polymerisation methods, for example by the methods described in British patent specifications Nos. 809,809, 821,158, 837,210, 842,420, 920,080 and 944,309. Isocyanurate polymers of especial value as constituents of the compositions of the invention are the isocyanurate polymers of tolylene-2:4-diisocyanate and tolylene-2:6-diisocyanate or mixtures thereof, and it is preferred to use those of such polymers which have a free diisocyanate content of less than 1% by weight, in order to minimise the effects of volatilisation when the compositions are cured by heating.

The proportion of organic polyisocyanate present in the compositions of the invention may be from 0.5% to 15% of the weight of the polyvinyl chloride constituent of the composition, preferably from 2% to 5% by weight.

The proportion of isocyanurate polymer present in the compositions of the invention may be from 0.5% to 15% of the weight of the polyvinyl chloride constituent of the composition, preferably from 2% to 5% by weight.

The polyvinyl chloride constituent of the compositions of the invention may be a plastisol, that is to say a suspension of finely divided polyvinyl chloride in a nonisocyanate reactive plasticiser, or an organosol, that is to say a suspension of polyvinyl chloride in a mixture of solvent and a non-isocyanate reactive plasticiser. It is preferred to use a paste of the plastisol type.

The polyisocyanate and the isocyanurate polymer may be incorporated into the polyvinyl chloride constituent of the compositions of the invention either separately or in the form of a previously prepared mixture, if desired together with a suitable non-isocyanate-reactive solvent. The polyisocyanate and the isocyanurate polymer may if desired be added to the polyvinyl chloride constituent immediately before it is proposed to use the resulting composition as a coating or as an adhesive, but it is also possible to add them at an earlier stage provided that the composition is used within a period of about 3 days after mixing. This period of stability or "pot-life" of the compositions of the invention, during which they remain in a sufficiently fluid state for convenient use as coatings or adhesives, is considerably greater than that of known compositions containing solely an isocyanurate polymer, and is comparable with that of known compositions containing solely a polyisocyanate.

The compositions of the invention may contain, in addition to the bonding agent constituents already described, other additives which are conventional in polyvinyl chloride compositions. Such additives include further plasticizers, such as organic esters of phosphoric acid or of phthalic acid, stabilising compounds for the polyvinyl chloride, such as basic lead carbonate, fillers, pigments and antistatic agents such as carbon black. The additives must, however, be unreactive towards isocyanate groups.

The polyvinyl chloride compositions of the invention are valuable for producing coatings upon a variety of materials; the coatings are produced by applying a composition according to the invention to the material in question and then gelling or curing the composition by subjecting it to the action of heat. Such coatings, as has been stated above, are characterized by a greatly improved adhesion to the substrate.

Thus according to a further feature of the present invention there is provided a process for coating materials with polyvinyl chloride which comprises applying to the said materials a composition as hereinbefore defined containing an organic polyisocyanate free from isocyanurate rings and an isocyanurate polymer of an organic polyisocyanate, and thereafter heating the coated material.

The process of the invention is especially valuable for producing polyvinyl chloride coatings on textile materials composed of synthetic fibres. Such textile materials include those composed of fibres of polyamides, such as polyhexamethylene adipamide, including polymers of caprolactam, polyesters such as polyethylene terephthalate and polymers and copolymers of acrylonitrile.

The process may also be employed for producing coatings on non-textile articles composed of the above-mentioned synthetic materials and also of other materials such as polyvinyl chloride itself.

The compositions of the invention may be applied to the materials to be coated in any convenient manner, such as by spreading, dipping or calendering on conventional equipment or by any of these processes in combination.

After application of a composition of the invention to the material to be coated, the coated material is heated at a temperature of from 100° to 140° C. for a period of from 0.5 to 2 minutes in order partially to gel the composition. Further coats of a composition of the invention, or of a polyvinyl chloride composition, may subsequently be applied and heated in a similar fashion. Curing of the coatings and development of the bond between the polyvinyl chloride and the substrate material is then completed by heating at a temperature of from 150° to 180° C. for a period of from 1 to 10 minutes, if desired under pressure. If for any reason it is desired to store the partially-gelled coated material for more than a few days, the material should be coated with a polyvinyl chloride composition free from isocyanate bonding agent and partially-gelled. The drop in level of bond strength is then only slight after a week's storage.

In an alternative embodiment of the process of the invention, the organic polyisocyanate constituent may be applied alone to the material to be coated in a first stage, and a mixture of the polyvinyl chloride and isocyanurate polymer constituents then applied to the material so treated in a second stage. The polyisocyanate may be applied to the material to be coated either by passing the material through a solution of the polyisocyanate in a volatile, inert solvent, which is subsequently removed by evaporation, or by direct application in controlled quantities by means of a padding technique or a licking roller. The mixture of the polyvinyl chloride and isocyanaurate polymer is subsequently applied in the manner hereinabove described and may be followed by additional coats of the polyvinyl chloride either with or without bonding agent before final curing is effected.

The polyvinyl chloride compositions of the present invention may also be employed as adhesives and are particularly useful for bonding articles composed of polyvinyl chloride to other articles composed either of polyvinyl chloride or of other materials, either natural or synthetic, such as the materials hereinbefore mentioned upon which coatings may be produced using the compositions of the invention. The said articles which are to be bonded together are coated with a polyvinyl chloride composition of the invention and are then brought into contact with one another, preferably under pressure, the bonding process being completed by the application of heat.

Textile materials coated by the process of the invention have a wide variety of uses, for example, as waterproof fabrics, either garments or waterproof sheets or the like, as flexible belting material, particularly for use in the mining industry, for the manufacture of flexible ducting, and for the manufacture of "inflatable" buildings.

The invention is illustrated but not limited by the following examples in which parts and percentages are by weight.

EXAMPLE 1

A plastisol paste is prepared from the following ingredients:

|  | Parts |
| --- | --- |
| Paste-making vinyl chloride polymer | 100 |
| Trixylenyl phosphate | 45 |
| Dioctyl phthalate | 15 |
| Basic lead carbonate paste | 5 |

The ingredients are mixed in a laboratory paste mixer in the usual manner and the resulting paste is then divided into portions, which are subsequently combined by simple stirring with various proportions of different bonding agents as set out below. Each of the resulting compositions is spread on to a polyamide textile fabric as an initial coat, which is then brought to a semi-gelled condition by heating at a temperature of 100–110° C. for about 2 minutes. A second coat of the polyvinyl chloride paste, without any added bonding agent, is applied on top of the first coat and semi-gelled in a similar manner. The coated fabric is then doubled up and finally gelled for 10 minutes in a press at a temperature of 170° C. to give a compressed thickness about 15% less than that of the coated plies. The fabric/polyvinyl chloride "sandwich" thus obtained is allowed to cool to room temperature under pressure.

The bond strength between the fabric and the coating so prepared from each of the compositions is determined by measuring the load required to peel the coating away from the fabric, across a strip one inch wide.

The details of the identity and proportions of the bonding agents used, the bond strength obtained and the pot-life of the compositions are as follows:

| Bonding agent | Proportion of bonding agent, percent of weight of polyvinyl chloride | Bond strength, lbs./in. | Pot Life |
|---|---|---|---|
| None | | 6 | Several weeks. |
| Diphenylmethane 4:4'-diisocyanate composition [1] | 10 | 15 | Several days. |
| Isocyanurate polymer of tolylene 2:4-diisocyanate (40% solution in butyl acetate) | 12.5 | 24 | 6–8 hours. |
| Diphenylmethane 4:4'-diisocyanate composition [1] | 5 } | 48 | Several days. |
| Isocyanurate polymer of tolylene 2:4-diisocyanate (40% solution in butyl acetate) | 6.25 } | | |
| Triphenylmethane 4:4':4''-triisocyanate (20% solution in methylene chloride) | 10 | 34 | |
| Triphenylmethane 4:4':4''-triisocyanate (20% solution in methylene chloride) | 5 } | 53 | |
| Isocyanurate polymer of tolylene 2:4-diisocyanate (40% solution in butyl acetate) | 6.25 } | | |

[1] The product of phosgenation of a crude diaminodiphenylmethane, containing about 15% of polyamines (mainly triamines) obtained by condensing formaldehyde with aniline in the presence of hydrochloric acid.

The bonding strengths recorded above clearly illustrate the advantageous effect of the polyisocyanate/isocyanurate polymer combination as bonding agent.

EXAMPLE 2

A light-weight nylon fabric (5.5. oz./sq. yd.) is passed through a solution (a) having the following composition:

(a)

| | Parts |
|---|---|
| 50% solution in xylene of diphenylmethane 4:4'-diisocyanate | 2 |
| Methylene chloride | 98 |

The solvent is allowed to evaporate spontaneously and the treated fabric is then spread with a polyvinyl chloride composition (b) containing the following constituents:

(b)

| | Parts |
|---|---|
| Paste-making vinyl chloride polymer | 100 |
| Trixylenyl phosphate | 45 |
| Dioctyl phthalate | 15 |
| Basic lead carbonate paste | 5 |
| Isocyanurate polymer of tolylene 2:4-diisocyanate (40% solution in butyl acetate | 12.5 |

The coating is semi-gelled by heating at 100° C. for 2 minutes and a second coat of the polyvinyl chloride composition (b), but without any isocyanurate polymer present, is spread upon this first coat and semi-gelled in a similar manner. The coated fabric is then cut in two and plied up with the polyvinyl chloride faces in contact and finally gelled by heating in a platen press at 170° C. for 10 minutes, using a moulding frame of a thickness about 15% less than that of the plies. The product is cooled under pressure and test pieces 1" wide are cut for determination of bond strength as described in Example 1. The bond strength of the coated fabric is found to be 31 lbs./in. The bond strength of a fabric similarly coated but omitting the initial treatment of the fabric with the polyisocyanate is 13 lbs./in.

EXAMPLE 3

The following table provides other experimental results following the procedure described in Example 1:

| Bonding agent and weight used, expressed as a percent of the weight of p.v.c. | Bond strength lbs./in. | Pot life |
|---|---|---|
| (a) Uretedione dimer of diphenylmethane diisocyanate, 10% | 7.5 | Several days. |
| (b) Uretedione dimer as in (a) 5% plus isocyanurate polymer as used in Example 1, 6.25%. | 44 | More than 8 hours. |
| (c) Uretedione dimer of tolylene diisocyanate 10% | 16 | Several days. |
| (d) Uretedione dimer as in (c) 5% plus isocyanurate polymer as used in Example 1, 6.25%. | 44 | More than 8 hours. |
| (e) 75% solution in ethyl acetate of a reaction product of tolylene diisocyanate, butylene glycol and trimethylol propane 10%. | 14 | More than 24 hours. |
| (f) Solution as used in (e) 5% plus isocyanurate polymer as used in Example 1, 6.25%. | 31 | More than 8 hours. |

EXAMPLE 4

Using the basic p.v.c. paste composition and technique as described in Example 1 but using in place of a polyamide fabric a heavy belting fabric made from polyethyleneterephthalate the following results were obtained.

| Bonding Agent | Percent by weight of bonding agent on p.v.c. resin | Bond strength, lbs./in. | Pot-life remarks |
|---|---|---|---|
| (a) None | | Less than 10 | Several days. |
| (b) Diphenylmethane 4:4'-diisocyanate composition as used in Example 1 | 10 | 40 | More than 2 days. |
| (c) Isocyanurate polymer as used in Example 1 | 12.5 | 53 | 6–8 hours. |
| (d) Diphenylmethane 4:4'-diisocyanate composition as used in (b) plus Isocyanurate polymer as used in (c) | 5 / 6.25 | 80 | More than 24 hours. |

What we claim is:
1. A process for coating materials with polyvinyl chloride which comprises applying to the material a polyvinyl chloride composition containing, as bonding agent, a mixture of both an organic polyisocyanate free from isocyanurate rings and an isocyanurate polymer, and thereafter heating the coated material to adhere the polyvinyl chloride composition to said material, the amount of said organic polyisocyanate and the amount of said isocyanurate polymer each being in the range 0.5 to 15% by weight of the polyvinyl chloride constituent of the composition.

2. A process as claimed in claim 1 wherein the material is a textile composed of synthetic fibres.

3. A process as claimed in claim 2 wherein the synthetic fiber is a member of the group consisting of polyamide and polyester.

4. A process as claimed in claim 1 wherein the coated material is heated at a temperature of 100° to 140° C. for a period of from 0.5 to 2 minutes, after which at least one coat of polyvinyl chloride composition is applied and heated the coated article then being heated at a temperature of from 150° C. to 180° C. for a period of from 1 to 10 minutes.

References Cited
UNITED STATES PATENTS 3,012,008 12/1961 Lister _____ 260—75
3,210,439 10/1965 Aitken et al. _____ 117—161 X WILLIAM D. MARTIN, Primary Examiner T. G. DAVIS, Assistant Examiner U.S. Cl. X.R.

117—76, 161